(12) United States Patent
Li et al.

(10) Patent No.: US 10,992,147 B2
(45) Date of Patent: Apr. 27, 2021

(54) DIAGNOSTIC METHOD FOR ELECTRIC PROPULSION SYSTEM WITH RECONFIGURABLE BATTERY SYSTEM

(71) Applicant: GM GLOBAL TECHNOLOGY OPERATIONS LLC, Detroit, MI (US)

(72) Inventors: Shifang Li, Shelby Township, MI (US); William T. Ivan, Shelby Township, MI (US); Brendan M. Conlon, Rochester Hills, MI (US); Yue Fan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/582,692

(22) Filed: Sep. 25, 2019

(65) Prior Publication Data

US 2021/0091575 A1 Mar. 25, 2021

(51) Int. Cl.
*H02J 7/00* (2006.01)
*B60L 50/60* (2019.01)
*B60L 15/00* (2006.01)

(52) U.S. Cl.
CPC .......... *H02J 7/0024* (2013.01); *B60L 15/007* (2013.01); *B60L 50/66* (2019.02); *H02J 7/0021* (2013.01)

(58) Field of Classification Search
CPC ........ H02J 7/0024; B60L 50/66; B60L 15/007
See application file for complete search history.

(56) References Cited

U.S. PATENT DOCUMENTS

| | | | |
|---|---|---|---|
| 2013/0106356 A1* | 5/2013 | Nakao | B60L 58/21 320/118 |
| 2013/0234672 A1* | 9/2013 | Kubota | H02J 7/007 320/134 |
| 2014/0001838 A1* | 1/2014 | Watanabe | H02M 1/32 307/9.1 |
| 2019/0165713 A1 | 5/2019 | Namuduri et al. | |

* cited by examiner

Primary Examiner — Cortez M Cook
(74) Attorney, Agent, or Firm — Quinn IP Law (57) ABSTRACT

An electric propulsion system for a mobile platform includes a battery system connected to positive and negative bus rails, an accessory load having a rotary electric machine, a traction power inverter module ("TPIM"), and an accessory load, switches configured to transition the battery modules to a series-connected ("S-connected") configuration during a direct current fast-charging ("DCFC") operation of the battery system, and a controller. When battery modules of the battery system are connected in series during a direct current fast-charging ("DCFC") operation, the controller executes a diagnostic method to determine bus rail voltages on the positive and negative bus rails and a mid-bus voltage, identifies a diagnosed electrical condition of the electric propulsion system by comparing the voltages to expected values or ranges, and executes a control action in response to the diagnosed electrical condition.

19 Claims, 7 Drawing Sheets

| DIAG | $V_{1r}$ | $V_{2r}$ | $V_{mr}$ |
|---|---|---|---|
| 1 | $V_{11L} - V_{11H}$ | $V_{12L} - V_{12H}$ | $V_{1mL} - V_{1mH}$ |
| 2 | $V_{21L} - V_{21H}$ | $V_{22L} - V_{22H}$ | $V_{2mL} - V_{2mH}$ |
| 3 | $V_{31L} - V_{31H}$ | $V_{32L} - V_{32H}$ | $V_{3mL} - V_{3mH}$ |
| 4 | $V_{41L} - V_{41H}$ | $V_{42L} - V_{42H}$ | $V_{4mL} - V_{4mH}$ |
| 5 | $V_{51L} - V_{51H}$ | $V_{52L} - V_{52H}$ | $V_{5mL} - V_{5mH}$ |
| 6 | $V_{61L} - V_{61H}$ | $V_{62L} - V_{62H}$ | $V_{6mL} - V_{6mH}$ |

*Fig-6A*

| DIAG | $V_{1r}$ | $V_{2r}$ | $V_{mr}$ |
|---|---|---|---|
| 1 | $400 \pm V_{thd}$ | $-400 \pm V_{thd}$ | $0 \pm V_{thd}$ |
| 2 | $495 \pm V_{thd}$ | $-305 \pm V_{thd}$ | $95 \pm V_{thd}$ |
| 3 | $800 \pm V_{thd}$ | $0 \pm V_{thd}$ | $400 \pm V_{thd}$ |
| 4 | $0 \pm V_{thd}$ | $-800 \pm V_{thd}$ | $-400 \pm V_{thd}$ |
| 5 | $400 - 800 \pm V_{thd}$ @18 KHz | $-400 - 0 \pm V_{thd}$ @18 KHz | $0 - 400 \pm V_{thd}$ @18 KHz |
| 6 | $400 \pm V_{thd}$ | $-400 \pm V_{thd}$ | $0 \pm V_{thd}$ |

DIAGNOSTIC METHOD FOR ELECTRIC PROPULSION SYSTEM WITH RECONFIGURABLE BATTERY SYSTEM

INTRODUCTION

The present disclosure relates to a diagnostic method for use with an electric powertrain configured for energizing propulsion functions aboard a vehicle or other rechargeable mobile platform. Electric powertrains often include at least one polyphase/alternating current ("AC") rotary electric machine constructed from a wound stator and a magnetic rotor. The stator windings are connected to an AC-side of a power inverter, with a direct current ("DC")-side of the power inverter in turn connected to a DC voltage bus. When the electric machine functions as a traction motor, switching control of the ON/OFF states of individual semiconductor switches of the power inverter generates an AC output voltage at a level suitable for energizing the stator windings. The sequentially-energized stator windings produce a rotating magnetic field, which ultimately interacts with a rotor field to produce machine rotation and motor output torque.

The above-noted DC voltage bus is electrically connected to a voltage source, which is typically embodied as a multi-cell high-voltage battery system. Voltage ratings of batteries used for energizing the propulsion functions of motor vehicles and other mobile platforms continue to increase, with the increased pack voltages ultimately extending electric driving ranges and improving overall drive performance. Battery charging infrastructure and associated charging methodologies likewise continue to evolve.

For instance, some emerging DC fast-charging ("DCFC") stations are capable of providing charging voltages of 800-1000V or more, while older "legacy" DCFC stations may be capable of providing lower charging voltages, for instance 400-500V. In order to accommodate a wider range of charging voltages, some battery systems utilize multiple battery modules. The individual battery modules may be selectively connected in parallel during propulsion operations and in series during high-voltage charging operations, with the series connection enabling utilization of higher charging voltages.

SUMMARY

Described herein are an electric propulsion system for a mobile platform and a method for diagnosing electrical conditions of the electric propulsion system. The electric propulsion system includes a battery system, a traction power inverter module ("TPIM"), and an electric machine. The battery system, which is connected to positive and negative voltage bus rails, has multiple battery modules, a switching control circuit, and a controller. The controller is configured to execute instructions embodying a method for detecting and isolating a diagnosed electrical condition from among multiple possible electrical conditions, some of which may be indicative of electrical fault conditions and others of which may be considered to be normal or expected conditions.

Each battery module has a corresponding module voltage. The battery system as a whole has a total voltage referred to herein as the battery voltage. The switching control circuit selectively establishes either a series-connected ("S-connected") configuration of the battery modules in which the battery voltage is a multiple of the module voltage, or a parallel-connected ("P-connected") configuration in which the battery voltage equals the module voltage. When operating in the P-connected configuration, the module voltages are essentially equal for the various battery modules, as will be appreciated by those of ordinary skill in the art, with the number of battery modules used in a given construction of the battery system determining the voltage multiple for the S-connected configuration.

A direct current fast-charging ("DCFC") station provides a fast-charging voltage that may equal or greatly exceed the module voltage. In order to accommodate different possible charging voltages from a given encountered DCFC station, the switching control circuit is controlled upon connection to the DCFC station to select between the S-connected and P-connected configurations. The controller may select the appropriate configuration based on various mode selection factors, such as but not limited to the available maximum charging voltage from the DCFC station, temperatures and states of charge of the battery modules or the constituent battery cells thereof, and/or other factors. In this manner, the battery system is able to flexibly utilize higher or lower DCFC voltages.

As recognized herein, the act of switching to the S-connected configuration from the P-connected configuration may at times result in certain electrical conditions. Some electrical conditions are fault conditions. Others are normal or expected conditions. The construction of the individual switches forming the switching control circuit may be responsible for some of the electrical conditions, e.g., possible faults in the hardware embodying relays or contactors, or solid-state/high-energy semiconductor switches such as IGBTs or MOSFETs. The controller is therefore configured to execute the present method in order to help identify and isolate fault and no-fault electrical conditions in the electric propulsion system, for instance an electrical short of a positive or negative bus rail to chassis-ground, a motor winding fault, and other electrical fault or no-fault conditions as described herein.

The battery system is selectively connectable to an electrical load, such as an accessory load such as an auxiliary power module ("APM"), a compressor, the TPIM, etc. Multiple battery modules of the battery system have a module voltage, with the battery system also including a switching control circuit having switches each with a corresponding ON/OFF state. The switching control circuit is configured, via operation of the switches, to connect the battery modules in parallel to provide a first battery voltage equal to the module voltage. The parallel configuration is established during propulsion of the mobile platform via the rotary electric machine. A series configuration is selectively established via the switches to provide a second battery voltage at a multiple of the module voltage, which occurs during a charging operation of the battery.

In response to the battery modules being connected in series, the controller determines first (positive) and second (negative) bus rail voltages on the positive and negative bus rails, respectively, and a mid-bus voltage between the positive and negative rails, and then identifies a diagnosed electrical condition from among a plurality of possible electrical conditions using the first and second bus rail voltages and the mid-bus voltage. The controller thereafter executes a suitable control action in response to the diagnosed electrical condition. For instance, the control action may include recording a diagnostic code in memory of the controller that is indicative of the diagnosed electrical condition Voltage sensors respectively connected to the bus rails and a mid-bus rail located therebetween may be used to measure the first (positive) and second (negative) bus rail voltages and a mid-bus voltage. The possible electrical conditions may include a short-to-ground condition of the positive or negative bus rail, and/or a short-to-ground condition of the mid-bus rail when the accessory load is connected to the bus. The possible electrical conditions may also include no-fault conditions in which the controller detects an expected voltage shift between the positive and negative bus rails when the electrical load is connected during the fast-charging operation.

Additionally, the possible electrical fault conditions may include a motor winding fault of the rotary electric machine. For instance, the controller may detect the motor winding fault by detecting a predetermined voltage oscillation at a predetermined switching frequency of each of the first (positive) and second (negative) bus rail voltages and the mid-bus voltage.

The controller may include a lookup table populated with expected values for the positive and negative bus rail voltages and the mid-bus voltage. In such an embodiment, the controller may identify and isolate the possible electrical conditions by comparing the various voltages to expected voltages stored in the lookup table.

A mobile platform is also disclosed herein that, according to an exemplary embodiment, includes road wheels connected to a platform body, an electrical load including a rotary electric machine configured to power the road wheels and thereby propel the mobile platform, and the above-noted battery system, voltage sensors, switching control circuit, and controller.

Additionally, a diagnostic method is disclosed for use with the above-noted electric propulsion system. In a particular embodiment of the method, in response to a transition from the P-connected configuration to the S-connected configuration prior to the charging of the battery system, the controller determines positive and negative bus rail voltages on the positive and negative bus rails, respectively, as the above-noted first and second bus rail voltages, and also determines the mid-bus voltage. The method includes identifying an electrical condition of the electric propulsion system, as a diagnosed condition, from among a plurality of possible electrical conditions using the bus rail voltages and the mid-bus voltage, including referencing a lookup table populated with expected values for the voltages. The method further includes executing a control action in response to the diagnosed electrical condition, including recording a diagnostic code in memory of the controller that is indicative of the diagnosed electrical condition.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Figure 1:
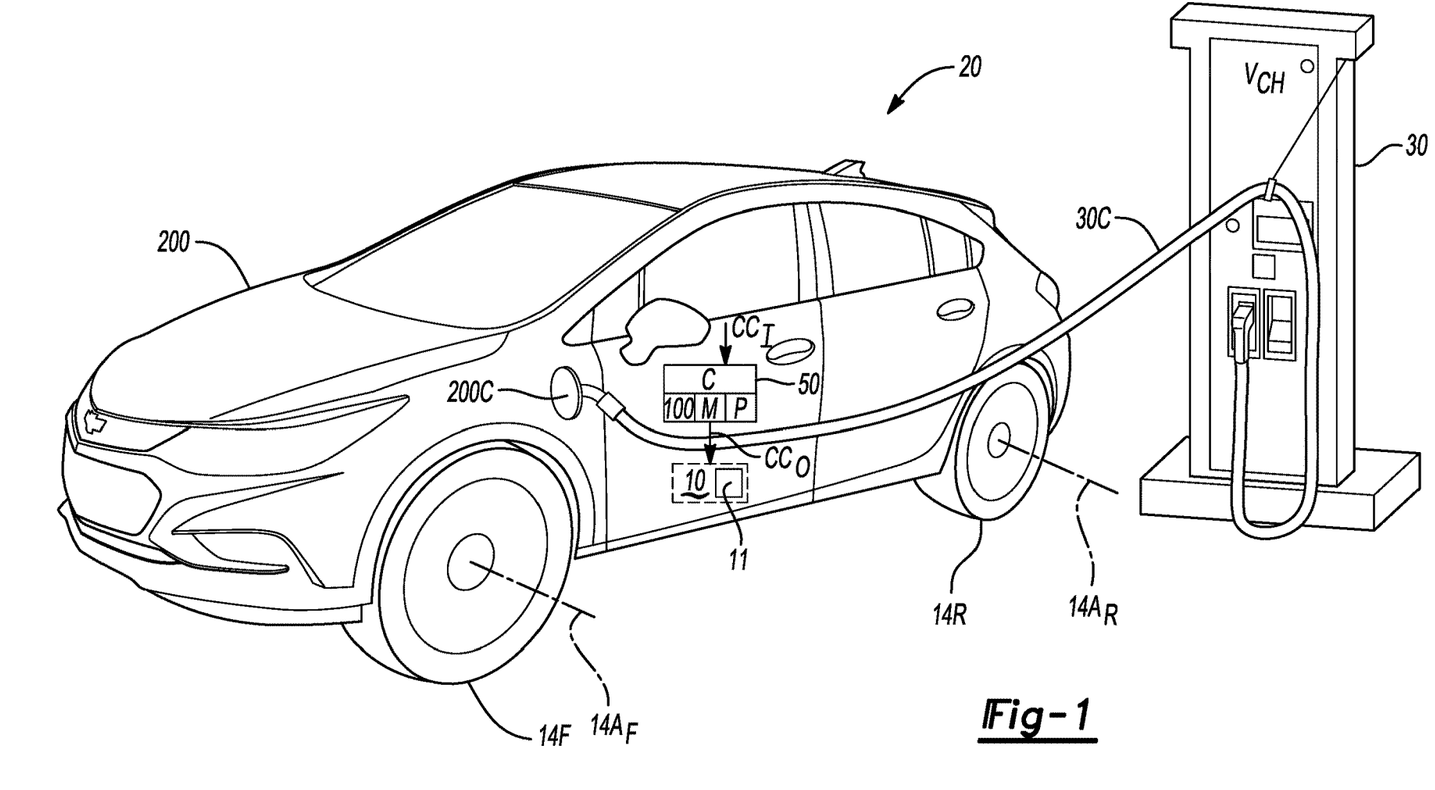
FIG. 1 is a schematic illustration of a mobile platform undergoing a direct current fast-charging ("DCFC") operation.

Referring to the drawings, wherein like reference numbers refer to the same or like components in the several Figures, a mobile platform 20 is depicted in FIG. 1 that includes a body 200 and an electric propulsion system 10, with the electric propulsion system 10 including a battery system 11. In the depicted representative embodiment, the electric propulsion system 10 powers propulsion functions of the mobile platform 20, with "exemplary" as used herein meaning a non-limiting example configuration illustrating certain aspects of the present teachings, i.e., not necessarily advantageous or preferred over other possible implementations. The mobile platform 20 is shown undergoing a direct current fast-charging ("DCFC") operation in which the battery system 11 is electrically connected to an off-board DCFC station 30, e.g., via a vehicle charging port 200C that is internally connected to a DC charge coupler (not shown) using a length of high-voltage charging cable 30C. Although not shown in FIG. 1, the end connection of the charging cable 30C may be an SAE J1772 or other suitable charging plug or connector.

The battery system 11, the internal structure and reconfigurable series-parallel switching control of which is described in detail below with reference to FIGS. 2A and 2B, may be used as part of the mobile platform 20 of FIG. 1 or as within other rechargeable electrical systems, such as but not limited to mobile power plants, robots, conveyor or transport platforms, etc. For vehicular applications, non-motor vehicles including aircraft, marine vessels, and rail vehicles may enjoy similar benefits. For illustrative consistency, the mobile platform 20 will be described hereinafter as an exemplary application benefitting from the present teachings to vehicular applications in general or motor vehicle applications in particular.

The mobile platform 20 in the illustrated embodiment includes front and rear road wheels 14F and 14R, respectively. The road wheels 14F and 14R are connected to separate front and rear drive axles 14AF and 14AR, respectively. In an all-wheel drive ("AWD") embodiment, the drive axles 14AF and 14AR may be individually powered by separate rotary electric machines (not shown) each functioning as traction motors via corresponding traction power inverter module 25 or 125, which are depicted schematically in FIGS. 3 and 5 as described below.

The mobile platform 20 may be variously embodied as a plug-in electric vehicle having the battery system 11, e.g., a multi-cell lithium ion, zinc-air, nickel-metal hydride, or lead acid battery system 11, that can be selectively recharged via a charging voltage ("$V_{CH}$") from the off-board DCFC station 30. When the mobile platform 20 is in operation, switching control of the battery system 11 is performed by a controller 50, via control signals (arrow $CC_O$), to ultimately energize a rotary electric machine 28 (see FIGS. 3 and 5) to generate and deliver motor torque to the road wheels 14F and/or 14R, and to thereby propel the mobile platform 20 and/or to perform other useful work. Thus, the battery system 11 and the controller 50 together form the battery system 11, with other possible components such as thermal management/cooling and power electronic hardware omitted for illustrative clarity.

The controller 50 of FIG. 1 includes a processor (P) and memory (M), with the memory (M) including application-suitable amounts of tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute instructions 100 embodying a fault detection and isolation method, with the controller 50 receiving input signals (arrow $CC_I$) indicative of a drive-requested or autonomously-requested charging mode of the battery system 11 and, in response, outputting the control signals (arrow $CC_O$).

Some of the input signals (arrow $CC_I$) may be determined during a charging operation as part of ongoing communication between the controller 50 and the DCFC station 30, as will be appreciated by those of ordinary skill in the art. Such communication occurs upon connection of the mobile platform 20 to the DCFC station 30, such as when the DCFC station 30 communicates its maximum charging voltage ($V_{CH}$) to the controller 50. In a drive/propulsion mode, an operator-requested or autonomously-determined propulsion request may cause the controller 50 to establish a parallel-connected ("P-connected") configuration of the battery system 11. During certain DCFC operations, the controller 50 may selectively reconfigure the battery system 11 to a series-connected ("S-connected") configuration to take advantage of the charging voltage $V_{CH}$, as will now be described with reference to FIGS. 2A and 2B.

Figure 2A:
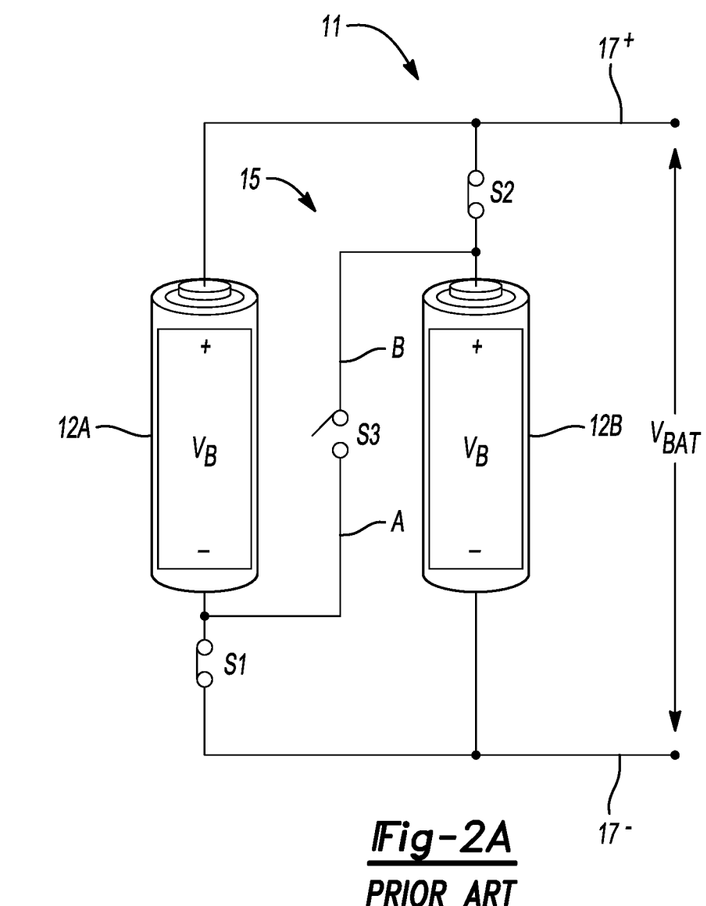
FIGS. 2A and 2B are schematic prior art circuit diagrams of a representative pair of battery modules connected in parallel and in series, respectively.

Referring to FIG. 2A, in a simplified embodiment the battery system 11 may be constructed from as few as two battery modules 12A and 12B. Additional battery modules may be used in other embodiments, with the two battery modules 12A and 12B used hereinafter solely for illustrative consistency and simplicity. The battery modules 12A and 12B are depicted in a P-connected configuration, with each battery module 12A and 12B having a battery module voltage $V_B$ as noted above, with the battery voltage $V_{BAT}$ being equal to the battery module voltage $V_B$.

In an illustrative and non-limiting embodiment, the battery module voltage $V_B$ may be in the range of about 400-500V and the charging voltage $V_{CH}$ from the DCFC station 30 of FIG. 1 may either be in the same range, or the charging voltage $V_{CH}$ may be higher, for instance 800-1000V, with other battery and charging voltage levels also being usable within the scope of the disclosure. Thus, the P-connected configuration of FIG. 2A has a battery voltage $V_{BAT}$ that is the potential difference between positive and negative DC bus rails 17⁺ and 17⁻, and that is equal to the battery module voltage $V_B$. In the S-connected configuration of FIG. 2B, the battery voltage $V_{BAT}$ is a multiple of the battery module voltage $V_B$, with the multiple being the number of S-connected battery modules used in the construction of the battery system 11.

Figure 2B:
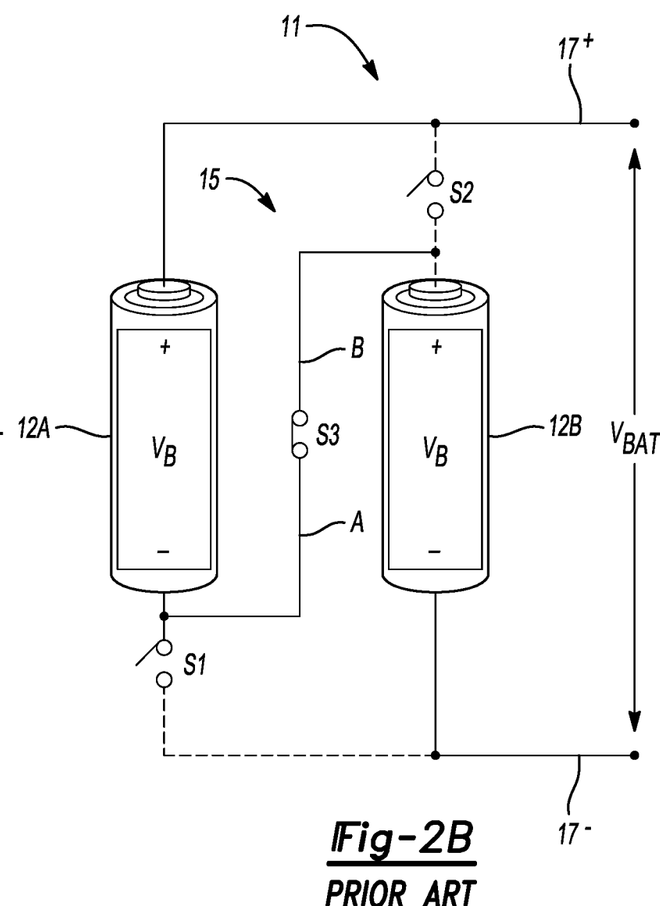

In the exemplary circuit topology of FIGS. 2A and 2B, which uses two battery modules 12A and 12B for illustrative simplicity, a switching control circuit 15 is constructed from multiple switches, e.g., switches S1, S2, and S3, with more than three switches possibly used in other embodiments. The switches S1, S2, and S3 may be configured as electromechanical and/or electromagnetic switches such as relays or contactors, or as solid-state semiconductor switches such as MOSFETs, IGBTs, etc. For illustrative simplicity, therefore, the individual switches S1, S2, and S3 are depicted as binary switches having an ON/conducting state when in a closed position and an OFF/non-conducting state when in an open position.

Switch S1 is connected between the negative (−) terminal of battery module 12A and the negative DC bus rail 17⁻, while switch S2 is connected between the positive (+) terminal of battery module 12B and a positive DC bus rail 17⁺. Switch S3 in turn is disposed between the battery modules 12A and 12B. Specifically, one side (A) of switch S3 is connected between switch S1 and the negative (−) terminal of battery module 12A, with an opposing side (B) of the switch S3 being connected between the positive (+) terminal of battery module 12B and switch S2.

When switch S3 is opened and switches S1 and S2 are closed, which is the case depicted in FIG. 2A, the battery modules 12A and 12B are connected in electrical parallel. Likewise, when switch S3 is closed and switches S1 and S2 are opened, as shown in FIG. 2B, the battery modules 12A and 12B are connected in electrical series. Therefore, the battery voltage $V_{BAT}$ increases in FIG. 2B relative to its level in FIG. 2A, and thus the battery system 11 is able to utilize a higher charging voltage relative to the configuration of FIG. 2A. The ON/OFF state of switch S3 remains opposite to the ON/OFF state of switches S1 and S2 regardless of whether the battery modules 12A and 12B are in a P-connected or an S-connected configuration.

Figure 3:
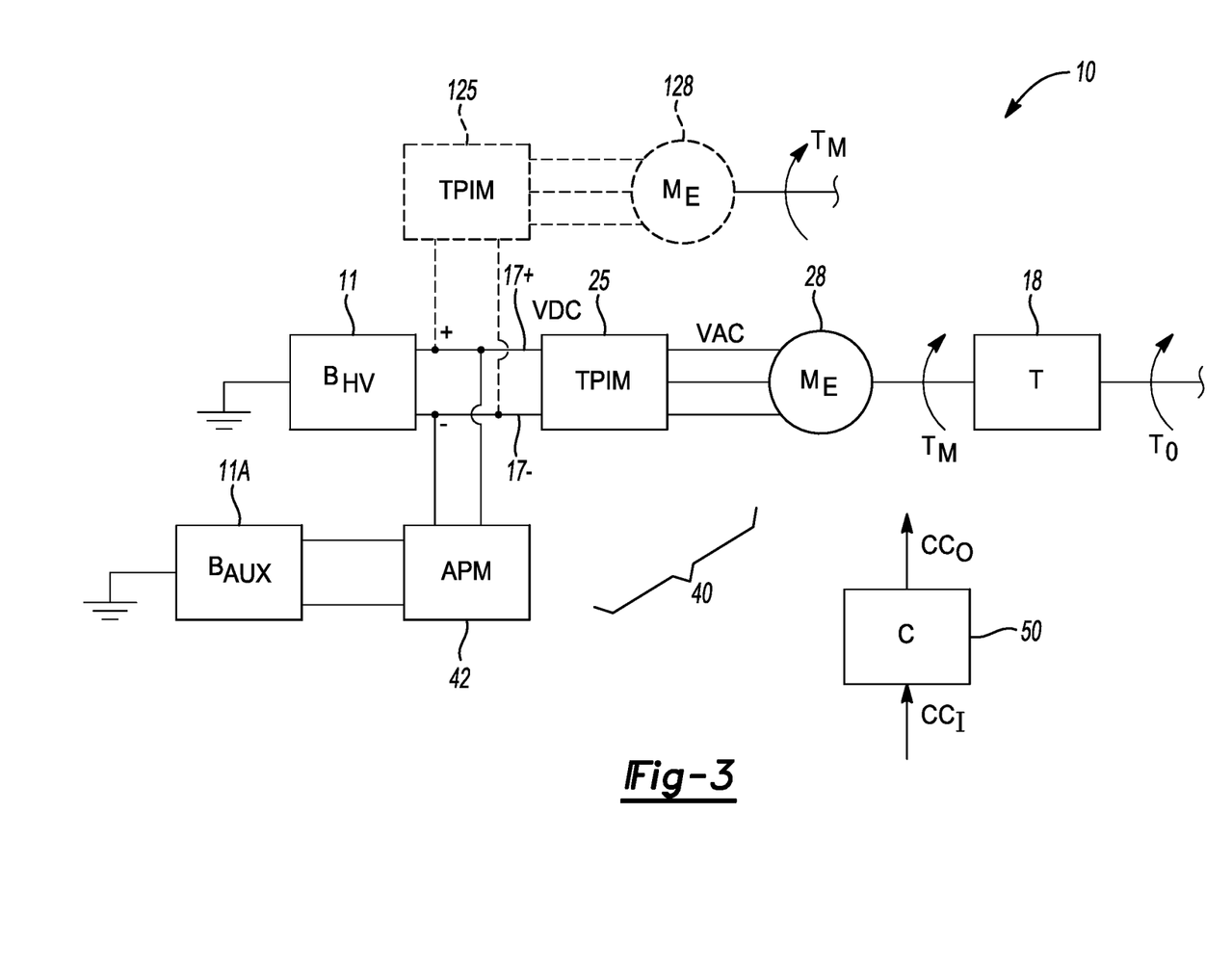
FIG. 3 is a schematic illustration of a mobile platform having the electric propulsion system.

Referring briefly to FIG. 3, the electric propulsion system 10 may include the battery system ("$B_{HV}$") 11, TPIM 25, electric machine ("$M_E$") 28, and a gearbox or transmission ("T") 18. A DC-DC converter or auxiliary power module ("APM") 42 may be connected to the positive and negative bus rails 17⁺ and 17⁻ and configured to reduce the battery voltage level to levels suitable for charging an auxiliary battery ("$B_{AUX}$") 11A. e.g., 12-15V. Another TPIM 125 and electric machine 128 may be used in some embodiments, with torque (arrow $T_M$) from the electric machines 28 and/or 128 directed to the front and/or rear road wheels 14F and 14R depending on the operating mode. Thus, an electrical load placed on the battery system 11 is collectively referred to herein as an accessory load 40, with certain diagnostic conditions depending on whether or not the accessory load 40 is connected to the voltage bus during charging of the battery system 11 as set forth below.

Figure 4:
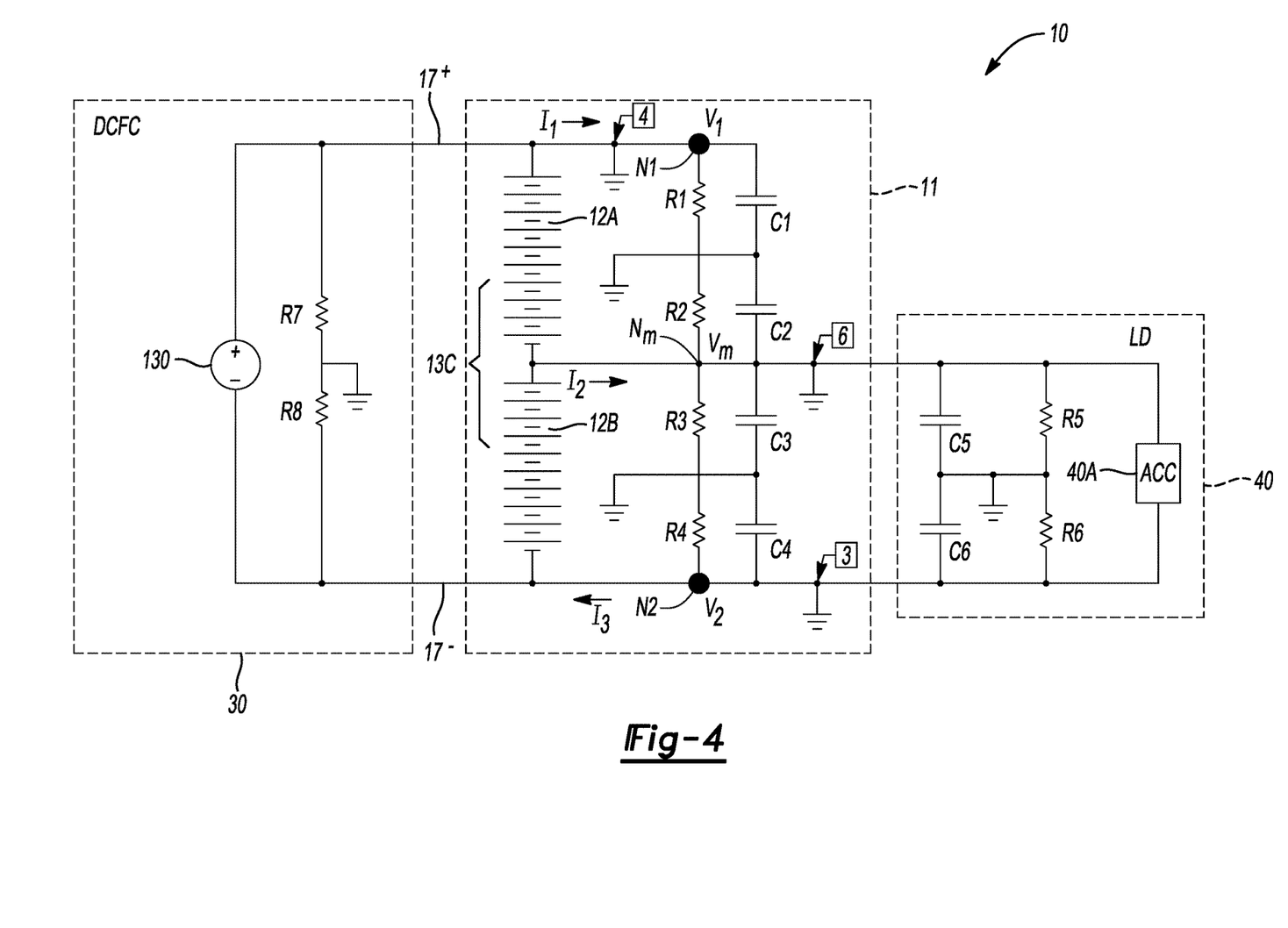
FIGS. 4 and 5 are schematic circuit diagrams of an electric propulsion system having the series-connected battery modules of FIG. 2B and a connected electrical load during a DCFC operation.

Referring to FIG. 4, the battery system 11 is electrically connected to the DCFC station 30 and the accessory load ("LD") 40, such as but not limited to the APM 42 of FIG. 3, the electric machine(s) 28 and/or 128, the TPIMs 25 and/or 125, an air conditioning control module, etc. The electrical circuit described herein may include the DCFC station 30, the battery system 11, and the accessory load 40. Isolation resistors in the DCFC station 30 are represented as R7 and R8. Likewise, at the accessory load 40 shown at far right in FIG. 4, the capacitors are represented by C5 and C6 and the isolation resistors are represented as R5 and R6, with a nominal accessory ("ACC") 40A shown schematically. The battery system 11 includes a cell stack 13C, with isolation resistors R1 and R2, and capacitors C1 and C2 for battery module 12A and its associated power electronics, and with isolation resistors R3 and R4 and capacitors C3 and C4 for battery module 12B and its associated power electronics.

Within the battery system 11 during a DC fast-charging process, a mid-bus node $N_m$ is present at a midpoint of the DC voltage bus, i.e., at mid-bus rail located between the positive and negative bus rails 17$^+$ and 17$^-$, as will be appreciated by those of ordinary skill in the art. A mid-bus voltage $V_m$ is present at the mid-bus node $N_m$. The positive DC bus rail 17$^+$ has a sensor node N1 with a corresponding first (positive) bus rail voltage $V_1$, with sensor node N1 possibly including a voltage sensor operable for measuring and reporting the first (positive) bus rail voltage $V_1$ to the controller 50. Likewise, a second (negative) bus rail voltage $V_2$ is present on the negative DC bus rail 17$^-$ at a sensor node N2, with the total voltage capability of the battery system 11 being the potential between sensor nodes N1 and N2.

As annotated in FIG. 4, three current variables are assumed in the analysis of an electrical circuit corresponding to the battery system 11, where current $I_1$ flows into sensor node N1, current $I_3$ flows out of sensor node N2, and current (arrow $I_2$) flows out of mid-bus node $N_m$, with the indicated variables being used as set forth herein to diagnose and isolate certain electrical conditions, some of which may be fault conditions and others of which may be no-fault or fault-free/expected results. Boxes [3], [4], and [6] in FIG. 4 representing the locations of different potential faults.

Figure 5:
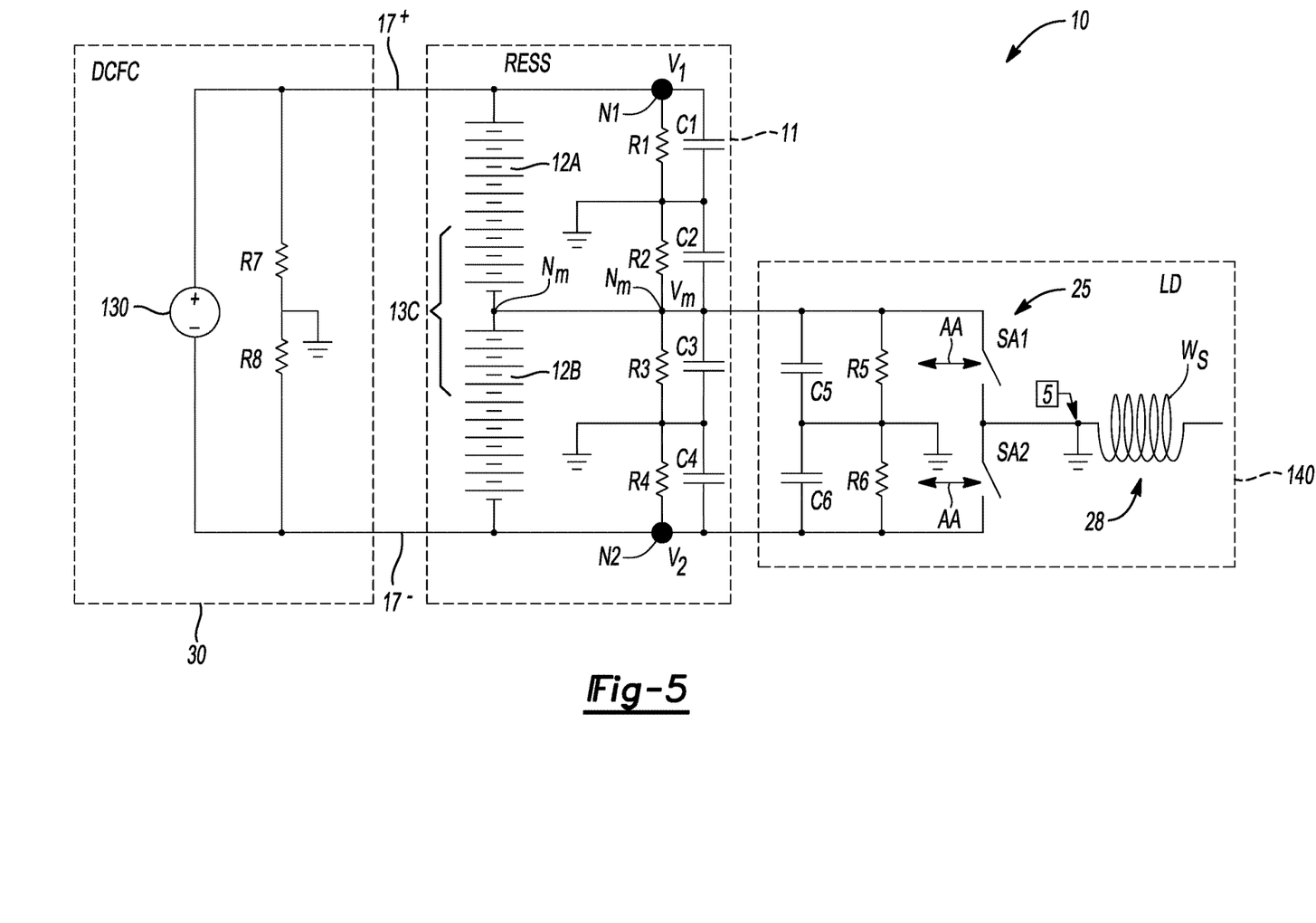

Referring briefly to FIG. 5, the accessory load 40 may be alternatively embodied as an accessory load 140 when the TPIM 25 and electric machine 28 are connected to the battery system 11. For illustrative simplicity, one phase leg of the TPIM 25 is depicted in FIG. 5, with FIG. 5 likewise depicting a corresponding stator winding $W_S$ of the electric machine 28. As will be appreciated by those of ordinary skill in the art, the TPIM 25 includes multiple semiconductor switches having ON/OFF states controlled via pulse-width modulation ("PWM"), pulse-density modulation ("PDM"), or other suitable switching control techniques. The opening/closing operation of two such switches SA1 and SA2 is represented by double-headed arrows AA. For instance, the switches SA1 and SA2 may be commanded by the controller 50 of FIG. 1 or another electronic control device to toggle at a calibrated switching frequency, e.g., 10-20 kHz or another value depending on the application. When the electric machine 28 is connected as shown, another possible electrical fault condition may occur at the location indicated by box [5].

The battery system 11 may be analyzed mathematically as follows:

$$I_2 = C2\frac{dV_m}{dt} + \frac{V_m}{R2} + C3\frac{dV_m}{dt} + \frac{V_m}{R3} + C5\frac{dV_m}{dt} + \frac{V_m}{R5}$$

$$-I_3 = C4\frac{dV_2}{dt} + \frac{V_2}{R4} + C6\frac{dV_2}{dt} + \frac{V_2}{R6} + \frac{V_2}{R8}$$

$$I_1 = C1\frac{dV_1}{dt} + \frac{V_1}{R1} + \frac{V_1}{R7}$$

$$I_3 = I_1 + I_2$$

$$V_1 - V_m = V_{BAT}$$

$$V_m - V_2 = V_{BAT}$$

where, under steady-state conditions, the time derivative terms approach zero. With the system parameters of capacitors and resistors being known/predetermined values, the six unknowns of $V_1$, $V_2$, $V_m$, $I_1$, $I_2$, and $I_3$ can be calculated using the six above-noted equations.

Figure 6A:
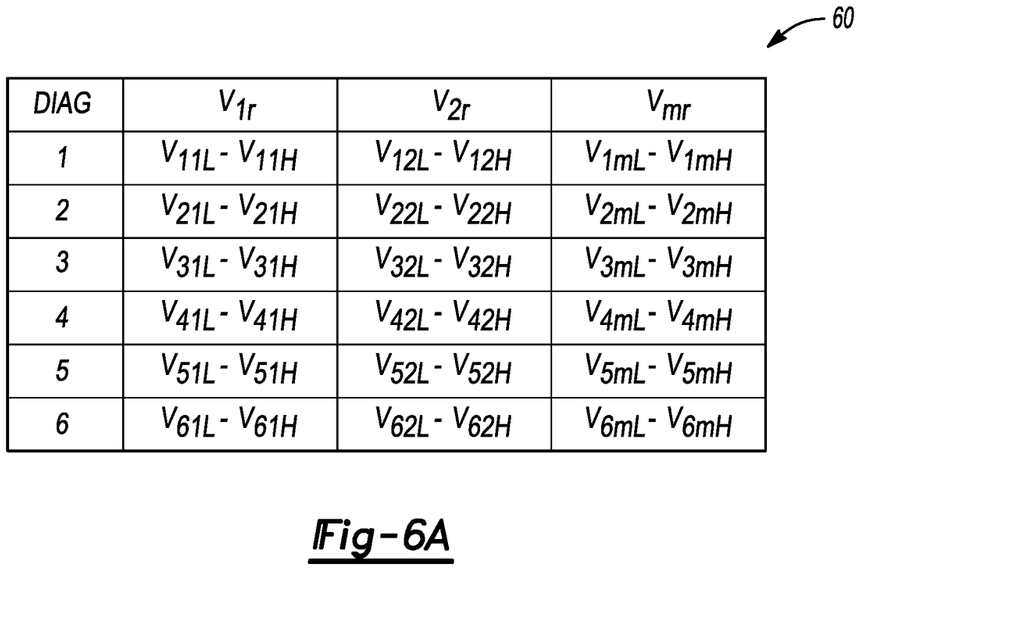
FIGS. 6A and 6B are respective generic and application-specific tables of possible diagnostic results within the electric propulsion system of FIGS. 4 and 5 using a non-limiting exemplary configuration of the battery system and DCFC station.

Referring to table 60 of FIG. 6A, from the above equations the expected/reference values for $V_1$, $V_2$, and $V_m$ can be obtained as noted above. Diagnostic ranges corresponding to each variable $V_1$, $V_2$, and $V_m$, are proposed considering possible HV bus ripples, component variance, etc., with each range having a low ("L") and high ("H") limit, may be related for an exemplary set of six diagnostic ("DIAG") results 1, 2, 3, 4, 5, and 6. For instance, for the first diagnostic case or result (1), the subscript "11L" in abbreviation "$V_{11L}$" refers to first diagnostic case (1), the first (positive) bus rail voltage (V1), and the low ("L") limit. Similarly, the subscript "12H" in abbreviation "$V_{12H}$" refers to first diagnostic case (1), the second (negative) bus rail voltage (V2), and the high ("H") limit, with "$V_m$", "$Vm_L$", and "$Vm_H$" respectively referring to the mid-bus voltage and its low and high limits. Note that battery voltage will vary during operation depending on load and other conditions. To account for this, a lookup table may be populated with adjusted threshold ranges derived from expected values for the above-noted bus rail and mid-bus voltages. For instance, the expected values may be adjusted by multiplying by a factor to account for battery voltage variance during operation depending on load and other conditions. For example, the positive bus voltage $V_1$ is multiplied by $(V_1-V_m)/(V_{1r}-V_{mr})$, the negative bus voltage $V_2$ is multiplied by $(V_2-V_m)/(V_{2r}-V_{mr})$, while the mid-bus voltage is multiplied by $(V_1-V_m)/(V_{1r}-V_{mr})$ if $V_m$ is positive, and by $(V_2-V_m)/(V_{2r}-V_{mr})$ if $V_m$ is negative.

Figure 6B:
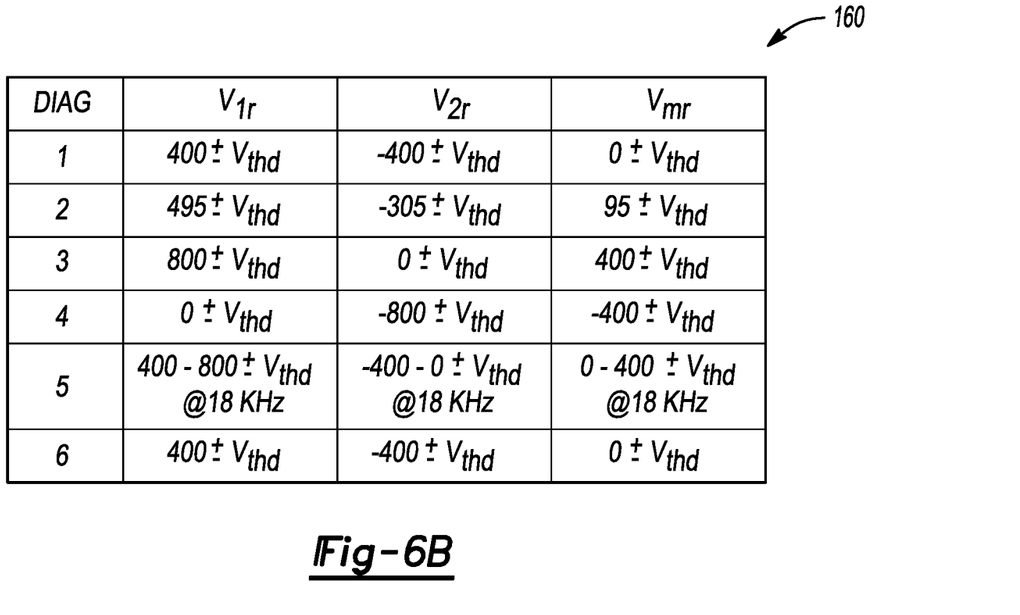

Table 160 of FIG. 6B is a non-limiting example scenario in which the battery module voltages ($V_B$) are 400V and the battery voltage ($V_{BAT}$) is 800V, and using example values of the capacitors and resistors in the DCFC station 30 and electric propulsion system 10, the low and high values in each range, for each of the diagnostic cases, may be calculated by subtracting or adding a threshold value ("$V_{thd}$"), and thus the values in the lookup table may be ranges as opposed to fixed discrete values. Likewise, the listed ranges and values in FIG. 6B are illustrative of one possible implementation of the present teachings.

Diagnostic conditions (1) and (2) of FIGS. 6A and 6B are normal or expected conditions during an exemplary DCFC operation, i.e., fault-free, with the accessory load 40 or 140 being off/not energized or on/energized, respectively. When the accessory load 40 or 140 is energized, the accessory load 40 or 140 is powered at less than the DCFC voltage, e.g., at 400V as used below with a DCFC voltage of 800V in FIG. 6B. Conditions 1 and 2 therefore depict a voltage shift that should occur when turning on the accessory load 40 or 140, in this example shifting the first bus rail voltage $V_1$ on the positive rail 17$^+$ of FIGS. 4 and 5 by an expected amount. The second bus rail voltage $V_2$ on the negative rail 17$^-$ thus likewise shifts by the expected amount. Thus, implementations of the present method 100 may include using lookup tables populated with the first and second bus rail voltages $V_1$ and $V_2$, and the mid-bus voltage $V_m$, with ranges and values that are relevant to the particular voltages used in the battery system 11.

Conditions 3-5 of FIGS. 6A and 6B describe various possible "fault" conditions, with other fault conditions being possible within the scope of the disclosure. In a particular embodiment, conditions 3, 4, and 6, which are respectively labeled in FIG. 4 as boxes [3], [4], and [6], correspond to negative bus, positive bus, and mid-bus short-to-body or short-to-chassis/ground conditions, respectively. Such short conditions are characterized by zero voltage ("0V") at one of the three sensor nodes N1, N2, or $N_m$. Condition 5 is depicted numerically as box [5] in FIG. 5 and represents a motor winding short fault, with a corresponding voltage oscillation pattern at each nodes N1, N2, and Nm for the first bus rail voltage $V_1$ at sensor node N1 and for the second bus rail voltage $V_2$ at sensor node N2. As with the values of the first and second bus rail voltages $V_1$ and $V_2$, the oscillation frequency and range is application-specific and depends on the particular configuration of the DCFC station 30, the battery system 11 of FIGS. 4 and 5, and the identity of the accessory loads 40 or 140.

Condition 6 describes an abnormal condition where the mid-bus voltage $V_m$ is expected to be non-zero value but becomes zero due to a fault when the accessory load 40 or 140 is connected to the voltage bus.

Such a result may be indicative of a mid-bus rail short-to-ground condition. In response to a transition from the P-connected configuration of FIG. 2A to the S-connected configuration of FIG. 2B prior to DC fast-charging of the battery system 11, the controller 50 determines the positive and negative bus rail voltages ($V_1$ and $V_2$) on the positive and negative bus rails, respectively, and the mid-bus voltage $V_m$. The method 100 proceeds by identifying an electrical condition of the electric propulsion system 10, as a diagnosed condition, from among a plurality of possible electrical diagnostic conditions (1)-(6) using the first and second bus rail voltages ($V_1$ and $V_2$) and mid-bus voltage $V_m$, including referencing a lookup table such as tables 60 or 160 populated with expected values for voltages $V_1$, $V_2$, and $V_m$. The method 100 also includes executing a control action in response to the diagnosed electrical condition, including recording a diagnostic code in memory (M) of the controller 50 that is indicative of the diagnosed electrical condition.

In executing the method 100, the controller 50 may progress through a logic flow by comparing the voltages $V_1$, $V_2$, and $V_m$ to corresponding ranges as set forth above, and then selecting a corresponding one of the diagnostic results. The control action taken by the controller 50 may be expected to vary with the result, with "normal" or "expected" results not necessarily requiring a particular action, or possibly resulting in the recording of a diagnostic code indicative of the result, while fault modes may trigger a particular action including recording a failing diagnostic code and possibly other hardware-related protection and/or recovery actions.

The possible electrical diagnostic conditions may include a short-to-ground condition of the positive bus rail when the first (positive) bus rail voltage V1 is 0 volts, a short-to-ground condition of the negative bus rail when the second (negative) bus rail voltage V2 is 0 volts, a short-to-ground condition of the mid-bus rail when the mid-bus voltage $V_m$ is 0 volts, and a no-fault condition in which the controller 50 detects an expected voltage shift between the positive and negative bus rails when the electrical load is connected to the battery system. The conditions could also include a motor winding fault of the rotary electric machine, with the controller 50 configured to detect the motor winding fault by detecting a voltage oscillation of the bus rail voltages $V_1$ and $V_2$ and the mid-bus voltage $V_m$ at a predetermined switching frequency.

Figure 7:
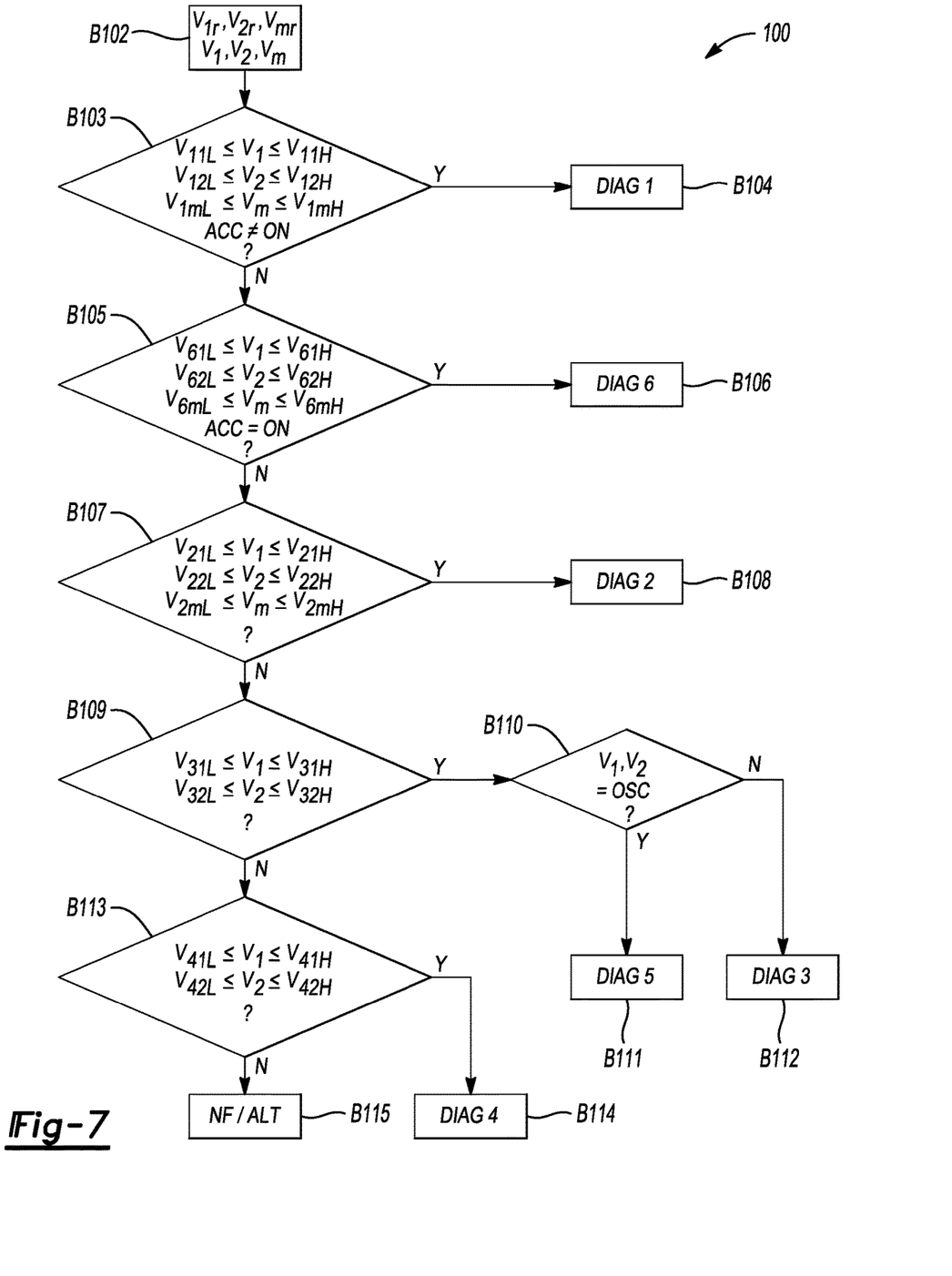
FIG. 7 is a flow chart describing an embodiment of the present diagnostic method.

Referring to FIG. 7, an example embodiment of the method 100 commences with block B102, with the controller 50 calculating expected values $V_{1r}$, $V_{2r}$, and $V_{mr}$ for the first (positive) and second (negative) bus rail voltages $V_1$ and $V_2$ and the mid-bus voltage $V_m$, respectively, e.g., using the above-noted mathematical approach. Such values may be stored in a lookup table, or the expected values may be calculated in real-time, e.g., using an equivalent circuit model. Block 102 also includes measuring or reading the first (positive), second (negative), and mid-bus voltages $V_1$, $V_2$, and $V_m$ at nodes N1, N2, and $N_m$, respectively. The method 100 proceeds to block B103 once the expected values have been calculated and the voltage readings have been received and temporarily recorded.

At block B103, the controller 50 compares each of the voltage readings from block B103 for the first and second bus rail voltages ($V_1$ and $V_2$) and the mid-bus voltage ($V_m$) to the expected values denoted by subscript "r", with the expected values being ranges having corresponding low and high thresholds for the first diagnostic condition, i.e., a normal or expected values when the accessory load 40 or 140 is disconnected from the voltage bus during charging. The method 100 proceeds to block B104 when the values fall within their assigned ranges and the accessory load 40 or 140 is not disconnected from the voltage bus. Otherwise, the method 100 proceeds to block B105.

Block B104 includes recording a diagnostic code indicative of the first diagnostic condition ("DIAG 1"), i.e., normal or expected conditions when the accessory load 40 or 140 is not running during charging. The method 100 resumes with block B102 in a calibrated control loop such that method 100 executes in such a loop during the entirety of the charging operation.

Block B105, which is analogous to block B103, includes comparing the voltage measurements from block B102 to threshold ranges indicative of a mid-bus short condition. That is, block B105 may determine if the mid-bus voltage $V_m$ is initially a non-zero value, similar to condition (2), but has transitioned to 0 volts when the accessory load 40 or 140 is connected to the voltage bus during charging. The controller 50 proceeds to block B106 when the conditions of block B105 are satisfied, and to block B107 in the alternative.

At block B106, the controller 50 records a diagnostic code indicative of the sixth diagnostic condition ("DIAG 6"), i.e., a possible mid-bus rail short-to-ground condition that could occur when the accessory load 40 or 140 are on during a DCFC process. The method 100 resumes with block B102 as noted above with respect to block B104.

Block B107 includes comparing the bus rail measurements from block B102 to the low/high threshold ranges for the second diagnostic condition, i.e., normal or expected conditions when the accessory load 40 or 140 is on or running during charging. The controller 50 proceeds to block B108 when the conditions of block B107 are satisfied, and to block B109 in the alternative.

At block B108, the controller 50 records a diagnostic code indicative of the second diagnostic condition ("DIAG 2"), i.e., normal or expected conditions in which the accessory load 40 or 140 is running during charging. The method 100 resumes with block B102 as noted above with respect to block B104.

Block B109 includes comparing the voltage measurements for the first (positive) and second (negative) bus rails voltages $V_1$ and $V_2$, and the mid-bus voltage $V_m$, to calibrated ranges for a short of the negative bus rail 17⁻ to the body 200 or other electrical ground of FIG. 1, and then proceeding to block B110 when the voltages fall within their corresponding expected ranges. The method 100 instead proceeds to block B113 when the voltages are outside of the corresponding ranges for such a condition.

Block B110 includes determining, via the controller 50, whether the voltages $V_1$, $V_2$, and $V_m$ oscillate ("OSC") within a particular voltage range at a particular frequency. The method 100 proceeds to block B111 when such oscillation is detected. Otherwise, the method 100 proceeds to block B112.

At block B111, the controller 50 records a diagnostic code indicative of the fifth diagnostic result ("DIAG 5"), i.e., a possible motor winding fault. The method 100 then resumes with block B102.

At block B112, the controller 50 records a diagnostic code indicative of the third diagnostic result ("DIAG 3"), i.e., a short of the negative bus rail 17⁻ to the body 200 or other electrical ground. The method 100 then resumes with block B102.

Block B113 includes comparing the voltage measurements for the bus rail voltages $V_1$, $V_2$, and $V_m$ to calibrated ranges for the fourth diagnostic condition, i.e., a possible short of the positive bus rail 17⁺ to the body 200 or other electrical ground. The method 100 proceeds to block B114 when the voltages fall within their corresponding ranges for such a condition. The method 100 instead proceeds to block B115 when the voltages are outside of the corresponding ranges.

Block B114 includes recording a diagnostic code indicative of the fourth diagnostic result ("DIAG 4"). The method 100 then resumes with block B102.

Block B115 includes recording a diagnostic code indicative of a no-fault or alternative fault condition ("NF/ALT"). Depending on the programming of the controller 50, that is, block B115 may be a no-fault condition or additional analysis may be performed with additional ranges corresponding to other possible fault modes. Therefore, the six indicated electrical conditions of FIGS. 6A, 6B, and 7 are not limiting, with more or fewer conditions possible used in other embodiments.

Use of the present method 100 may facilitate detection and isolation of electrical fault conditions in the electric propulsion system 10 of FIG. 1 in which an S-connected battery configuration is selectively enabled during charging to utilize higher charging voltages. As noted above, transitioning from a P-connected configuration to an S-connected configuration may increase the probability of experiencing certain electrical faults, such as but not limited to the fault conditions detailed in FIGS. 6A and 6B. These and other benefits may be readily envisioned by one of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electric propulsion system for a mobile platform, comprising:
    a battery system having multiple battery modules connected to positive and negative voltage bus rails of a direct current ("DC") voltage bus, wherein a first bus rail voltage is present on the positive bus rail, a second bus rail voltage is present on the negative bus rail, and a mid-bus voltage is present midway between the positive and negative bus rails;
    an accessory load including a rotary electric machine and a traction power inverter module ("TPIM"), wherein the accessory load is electrically connected to the positive and negative bus rails;
    a plurality of switches configured to transition the battery modules to a series-connected ("S-connected") configuration during a direct current fast-charging ("DCFC") operation of the battery system; and
    a controller configured, in response to the battery modules being transitioned to the S-connected configuration, to determine measured and expected values for each of the first and second bus rail voltages and the mid-bus voltage, to identify and isolate a diagnosed electrical condition of the electric propulsion system from among a plurality of possible electrical conditions by comparing the expected values to the measured values for each of the first and second bus rail voltages and the mid-bus voltage, and to execute a control action in response to the diagnosed electrical condition, wherein the possible electrical conditions include a no-fault condition in which the controller detects an expected voltage shift between the positive and negative bus rails when the accessory load is connected to the DC voltage bus during the DCFC operation.

2. The electric propulsion system of claim 1, further comprising multiple voltage sensor nodes in communication with the controller and configured to directly measure the first and second bus rail voltages and the mid-bus voltage.

3. The electric propulsion system of claim 1, wherein the possible electrical conditions include each of a short-to-ground condition of the positive bus rail when the first bus rail voltage is 0 volts, a short-to-ground condition of the negative bus rail when the second bus rail voltage is 0 volts, and a short-to-ground condition of a mid-bus rail between the first and second bus rails when the mid-bus voltage is 0 volts.

4. The electric propulsion system of claim 1, wherein the possible electrical conditions include a motor winding short fault of the rotary electric machine.

5. The electric propulsion system of claim 4, wherein the controller is configured to detect the motor winding short fault by detecting a predetermined oscillation occurring at a predetermined switching frequency of each of the first and second bus rail voltages and the mid-bus voltage.

6. The electric propulsion system of claim 1, wherein the controller is programmed with a lookup table populated with adjusted threshold ranges derived from the expected values for each of the first and second bus rail voltages and the mid-bus voltage, and the controller is configured to identify and isolate the possible electrical conditions by comparing the measured values of each of the first and second bus rail voltages and the mid-bus voltage to the adjusted threshold ranges.

7. The electric propulsion system of claim 1, wherein the controller is configured to calculate the expected values in real-time using an equivalent circuit model.

8. The electric propulsion system of claim 1, wherein the control action includes recording a diagnostic code in memory of the controller that is indicative of the diagnosed electrical condition.

9. The electric propulsion system of claim 8, wherein the control action includes discontinuing the DCFC operation in response to a short-to-ground condition of the positive bus rail, the negative bus rail, or the mid-bus rail during the DCFC operation.

10. A mobile platform comprising:
a body;
road wheels connected to the body; and
an electric propulsion system that includes:
- a battery system having multiple battery modules connected to positive and negative voltage bus rails of a direct current ("DC") voltage bus, wherein the positive and negative bus rails have a respective positive and negative bus rail voltage, and wherein a mid-bus voltage is present midway between the positive and negative bus rails;
- an accessory load that is electrically connected to the positive and negative bus rails, including a rotary electric machine configured to power the road wheels, and a traction power inverter module ("TPIM") connected to the battery system and the rotary electric machine;
- a plurality of switches configured to transition the battery modules to a series-connected ("S-connected") configuration during a direct current fast-charging ("DCFC") operation of the battery system; and
a controller configured, in response to the battery modules being transitioned to the S-connected configuration, to determine measured and expected values for the first and second bus rail voltages and the mid-bus voltage, to identify and isolate a diagnosed electrical condition of the electric propulsion system from among a plurality of possible electrical conditions by comparing the measured values to corresponding threshold ranges derived by the controller from the expected values, and to execute a control action in response to the diagnosed electrical condition, including recording a diagnostic code in memory of the controller that is indicative of the diagnosed electrical condition, wherein the possible electrical conditions include a no-fault condition in which the controller detects an expected voltage shift between the positive and negative bus rails when the accessory load is connected to the DC voltage bus during the DCFC operation.

11. The mobile platform of claim 10, further comprising multiple voltage sensor nodes in communication with the controller and configured to directly measure the first bus rail voltage, the second bus rail voltage, and the mid-bus voltage as the measured values.

12. The mobile platform of claim 10, wherein the possible electrical conditions include each of a short-to-ground condition of the positive bus rail in which the first bus rail voltage is 0 volts, a short-to-ground condition of the negative bus rail in which the second bus rail voltage is 0 volts, a short-to-ground condition of a mid-bus rail between the first and second bus rails in which the mid-bus voltage is 0 volts, and a motor winding short fault of the rotary electric machine in which a predetermined oscillation occurs at a predetermined switching frequency of each of the first and second bus rail voltages and the mid-bus voltage.

13. The mobile platform of claim 12, wherein the control action includes discontinuing the DCFC operation in response to the short-to-ground condition of the positive bus rail, the negative bus rail, or the mid-bus rail during the DCFC operation, or the motor winding short fault.

14. A method for use with an electric propulsion system having a rotary electric machine and a reconfigurable battery system connected to a direct current ("DC") voltage bus, the battery system having multiple battery modules, the method comprising:
- in response to a transition from a parallel-connected ("P-connected") configuration of the battery system to a series-connected ("S-connected") configuration prior of the battery system during a direct current fast charging ("DCFC") operation of the battery system, determining, via a controller, measured values for each of a positive bus rail voltage of a positive bus rail, a negative bus rail voltage of the negative bus rail, and a mid-bus voltage between the positive bus rail and the negative bus rail;
- calculating, via the controller, expected values of each of the first bus rail voltage, the second bus rail voltage, and the mid-bus voltage;
- identifying an electrical condition of the electric propulsion system, as a diagnosed condition, from among a plurality of possible electrical conditions by comparing the measured values of the first and second bus rail voltages and the mid-bus voltage to the expected values of the first and second bus rail voltages and the mid-bus voltage, respectively; and
- executing a control action in response to the diagnosed electrical condition, including recording a diagnostic code in memory of the controller that is indicative of the diagnosed electrical condition.

15. The method of claim 14, further comprising calculating the expected values in real-time using an equivalent circuit model.

16. The method of claim 14, wherein determining the first and second bus rail voltages and the mid-bus voltage includes directly measuring the first and second bus rail voltages and the mid-bus voltage via respective voltage sensors.

17. The method of claim 14, wherein the possible electrical conditions include a short-to-ground condition of the positive bus rail when the first bus rail voltage is 0 volts, a short-to-ground condition of the negative bus rail when the second bus rail voltage is 0 volts, and a short-to-ground condition of a mid-bus rail when the mid-bus voltage is 0 volt, and a no-fault condition in which the controller detects an expected voltage shift between the positive and negative bus rails when the accessory load is connected to the DC voltage bus during the DCFC operation.

18. The method of claim 14, wherein the possible electrical conditions include a motor winding short fault of the rotary electric machine, and identifying the electrical condition includes detecting a predetermined voltage oscillation of the first and second bus rail voltages and the mid-bus voltage at a predetermined frequency to thereby detect the motor winding fault.

19. The method of claim 14, wherein executing the control action includes discontinuing the DCFC operation in response to a short-to-ground condition of the positive bus rail, the negative bus rail, or the mid-bus rail during the DCFC operation.

* * * * *